Sept. 18, 1945. H. W. DIETERT 2,384,898
FILM OR PHOTOGRAPHIC PLATE PROCESSING MACHINE
Filed Sept. 14, 1942 4 Sheets-Sheet 1
FIG.I.
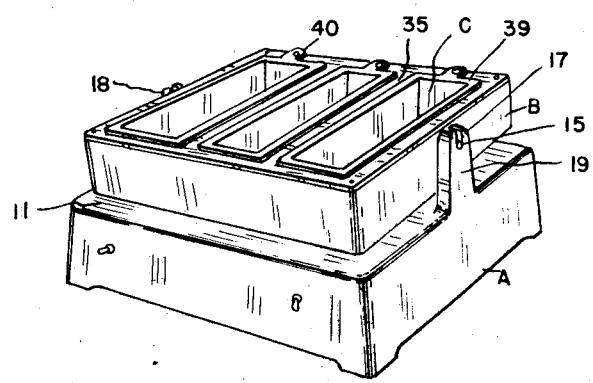
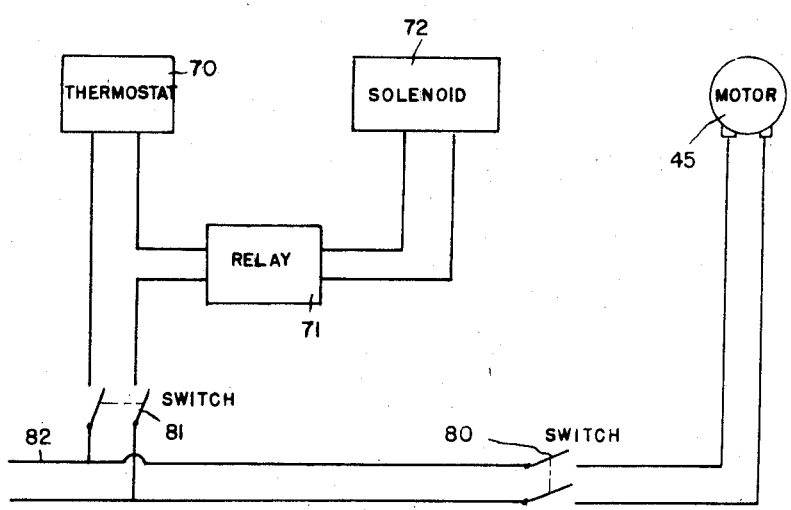
FIG.9.
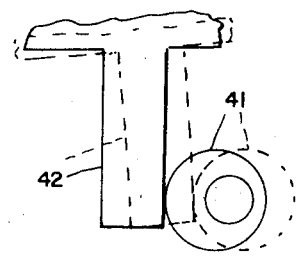
FIG.10.
INVENTOR.
HARRY W. DIETERT
BY
ATTORNEYS Sept. 18, 1945.  H. W. DIETERT  2,384,898
FILM OR PHOTOGRAPHIC PLATE PROCESSING MACHINE
Filed Sept. 14, 1942  4 Sheets-Sheet 2

INVENTOR.
HARRY W. DIETERT.
BY
*Whittemore, Hulbert & Belknap*
ATTORNEYS

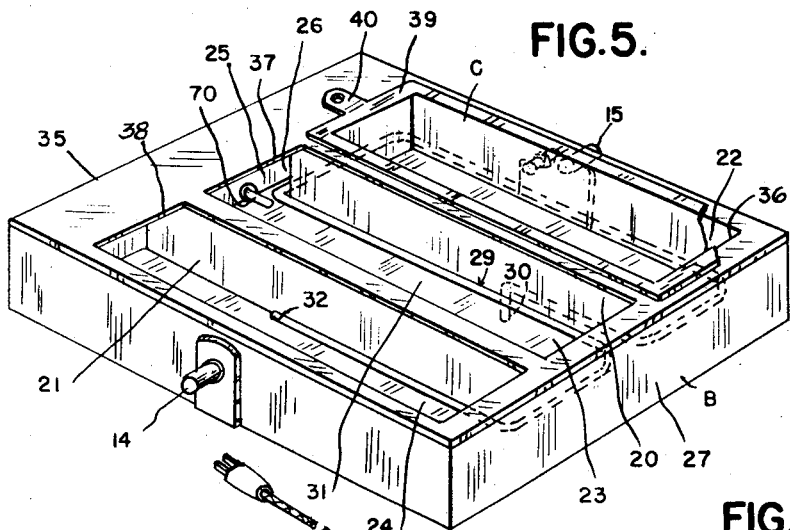
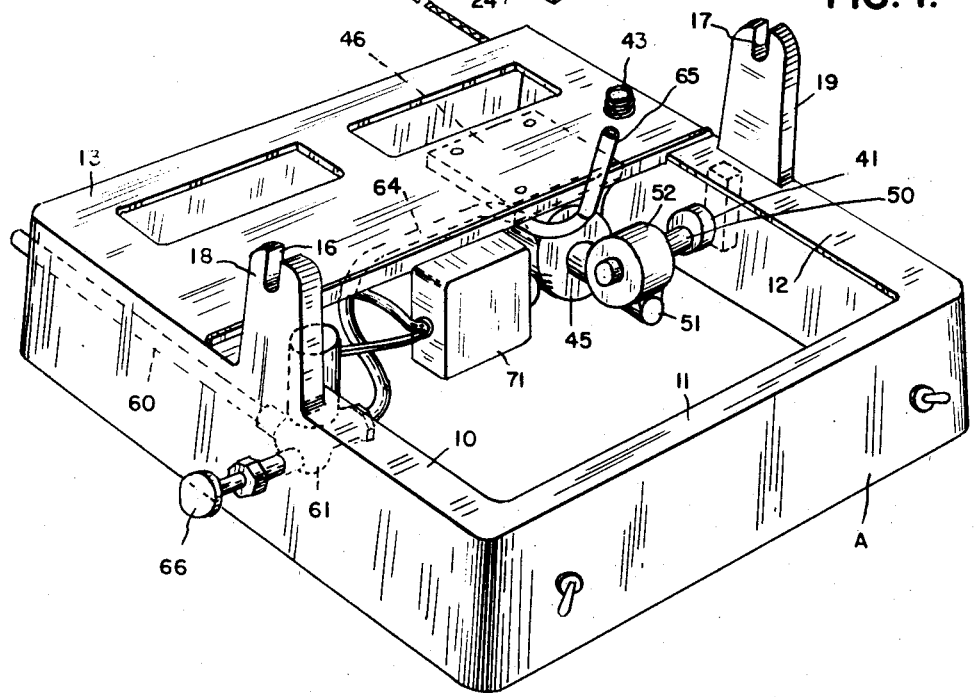

Sept. 18, 1945.  H. W. DIETERT  2,384,898
FILM OR PHOTOGRAPHIC PLATE PROCESSING MACHINE
Filed Sept. 14, 1942  4 Sheets-Sheet 4

*INVENTOR.*
HARRY W. DIETERT
BY
*ATTORNEYS*

Patented Sept. 18, 1945

2,384,898

UNITED STATES PATENT OFFICE 2,384,898

FILM OR PHOTOGRAPHIC PLATE PROCESSING MACHINE

Harry W. Dietert, Detroit, Mich.

Application September 14, 1942, Serial No. 458,281

6 Claims. (Cl. 257—2)

This invention relates generally to film or photographic plate processing machines.

One of the essential objects of the invention is to provide a machine of the type mentioned having means for increasing the speed and reproductibility of developing, hardening and fixing films and photographic plates.

Another object is to provide a machine wherein a number of acid-proof trays containing the developing, hardening, and fixing solutions for the films or photographic plates have a common support capable of being rocked at a definite rate so that the solutions will be agitated regularly over the films or photographic plates in the trays to assure uniform chemical action over the entire film or plate surface. Such rocking action also permits the use of stronger solutions to gain greater developing and fixing speed.

Another object is to provide a machine wherein the common support for the trays is preferably in the form of a tank containing a suitable cooling fluid, such as water, for the trays and solutions therein.

Another object is to provide a machine wherein means responsive to changes in temperature of the solutions in the trays is utilized to control the supply of fresh water to said tank.

Another object is to provide a machine wherein the arrangement of tank, pans and water control means is such that the water in the tank is maintained at a selected temperature and the solutions in the pans are maintained by the water within the tank at a predetermined temperature.

Another object is to provide a machine wherein the supply of fresh water to the tank is through a coil arranged in such a way within the tank that the heat of the water in the tank is slowly and substantially absorbed by the fresh water in the coil before being discharged therefrom into the tank. Thus this arrangement tends to equalize or average the temperatures of the water in the coil and tank and more easily and accurately maintain the temperature desired for the trays.

Another object is to provide a machine wherein the tank is divided by upright partitions into transversely extending chambers for the trays, alternate or successive partitions being provided at opposite sides of the tank with openings through which portions of the coil aforesaid extend and through which the water in the tank may flow in a circuitous course from the chamber at one end of the tank containing the outlet end of the coil to the chamber at the other end of the tank containing a suitable overflow or discharge pipe for water in the tank.

Another object is to provide a machine wherein the tank is mounted for rocking or tilting movement upon a hollow base which forms a housing or enclosure for the mechanism, including suitable mechanical and electrical parts, for operating the machine.

Another object is to provide a machine wherein the mounting for the tank permits the latter to be lifted or raised from the base to afford proper access to the operating mechanism.

Another object is to provide a machine wherein the means employed to rock or tilt the tank is constructed and arranged in such a way that the tank is constantly urged downward and maintained in proper lowered position in its mounting while being rocked or tilted. Thus, the rocking means effectively maintains the tank against accidental displacement from its mounting while being rocked.

Another object is to provide the operating mechanism with an electric circuit that includes two independently operable switches, one for controlling the temperature regulating means and the other for controlling the rocking means for the tank.

Another object is to provide a machine that is neat and compact in appearance, simple in construction, economical to manufacture, and efficient in operation.

Other objects, advantages and novel details of construction of this invention will be made more apparent as this description proceeds, especially when considered in connection with the accompanying drawings, wherein:

Figure 1 is a perspective view of a machine embodying my invention;

Figure 4 is a perspective view of the base and mechanism therein;

Figure 5 is a perspective view of the tank, and showing one of the trays mounted therein;

Figure 9 is a schematic diagram of the electric circuit, including the wiring, for the machine;

Figure 10 is a fragmentary enlarged view of the cam and depending projection of the tank showing by dotted and full lines different positions of said parts during operation thereof.

Figure 2:
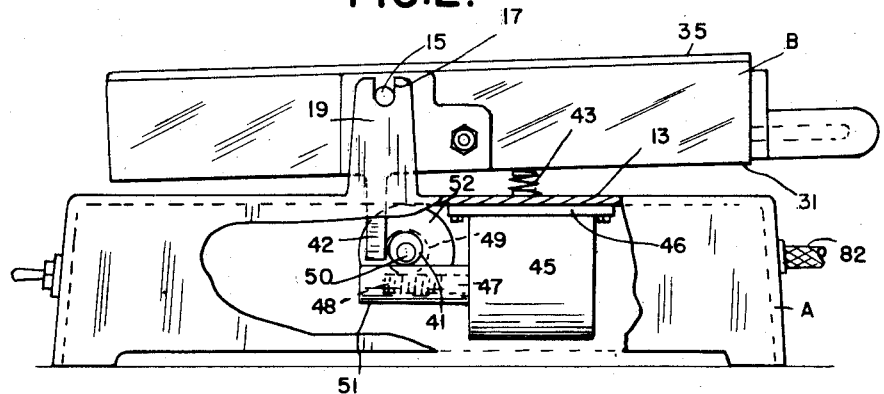
Figure 2 is an end view of the machine, with parts broken away and in section.
Figure 3:
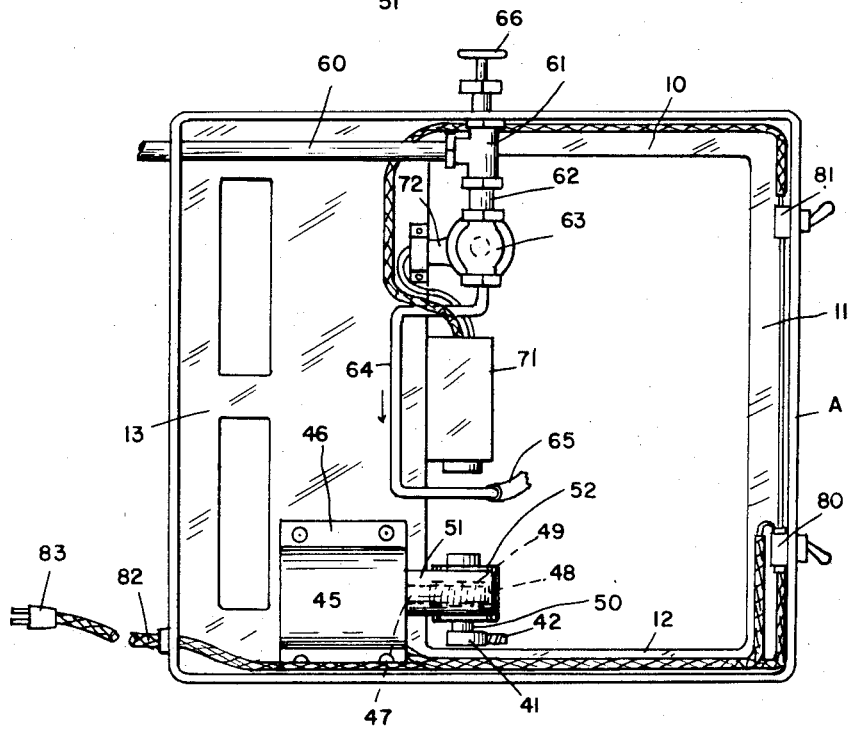
Figure 3 is a bottom plan view of the base and mechanism therein.
Figure 7:
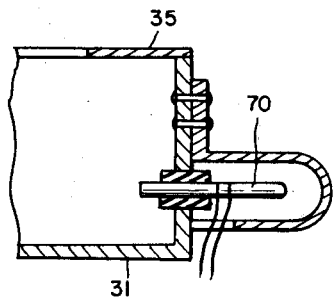
Figure 7 is a fragmentary vertical sectional view through a portion of the tank and thermostat carried thereby.
Figure 8:
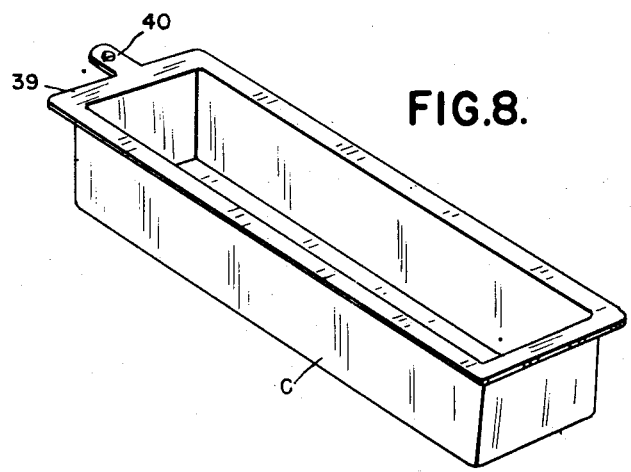
Figure 8 is a perspective view of one of the trays.
Figure 6:
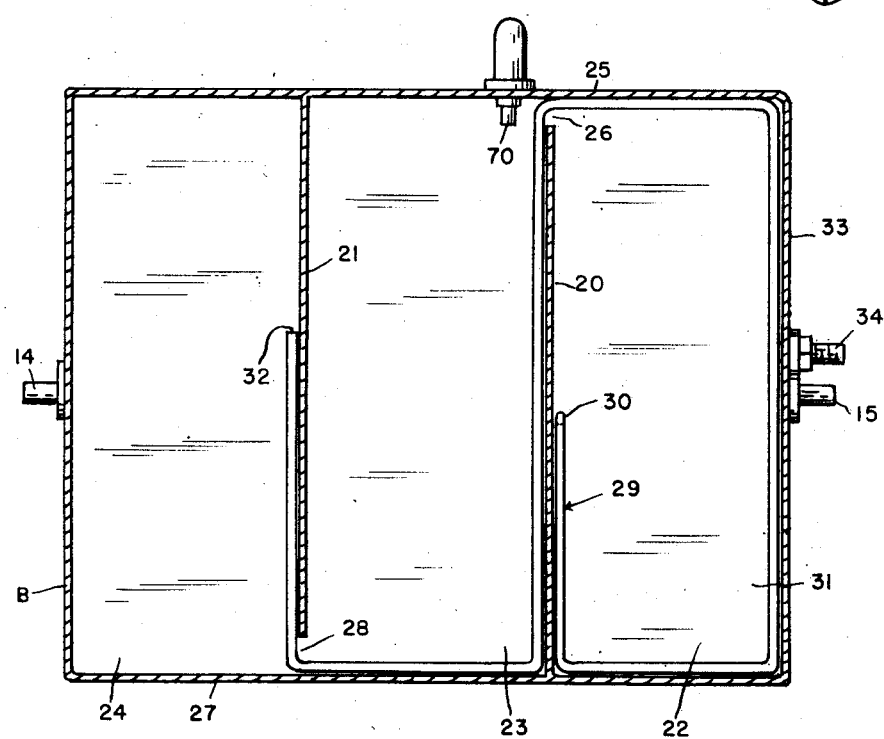
Figure 6 is a horizontal sectional view through the tank illustrated in Figure 5.

Referring now to the drawings, A is the base, B is the tank, and C are the pans of a machine embodying my invention.

As shown, the base A is preferably a hollow casting of substantially rectangular configuration open at the bottom and having inturned flanges 10, 11 and 12, respectively, and an apertured cover portion 13 at the top thereof.

The tank B is also rectangular in configuration but smaller than the base A. Preferably the tank B is provided at opposite ends thereof with trunnions 14 and 15, respectively, that rockably engage upwardly opening slots 16 and 17, respectively, in upstanding lugs or arms 18 and 19 on the inturned flanges 10 and 12, respectively, of the base. Within the tank B at spaced points longitudinally thereof are upright partitions 20 and 21 that divide the tank into a series of transversely extending chambers 22, 23 and 24, respectively. Preferably the partition 20 is provided adjacent the side wall 25 of the tank with an opening 26, while the partition 21 is provided adjacent the other side wall 27 of the tank with an opening 28. Also within the tank B is a fresh water supply coil 29 which preferably has its inlet portion 30 extending upwardly through the bottom 31 of the chamber 22 near the partition 20 and has its outlet portion 32 within the chamber 24 near the partition 21. Preferably the coil 29 rests upon the bottom 31 of the tank and extends from the inlet portion 30 along the adjacent side of the partition 20 to the side wall 27, thence along the side wall 27 to the end wall 33, thence along the end wall 33 to the side wall 25, thence along the side wall 25 and through the opening 26 in the partition 20, thence along the other side of the partition 20 to the side wall 27, thence along the side wall 27 and through the opening 28 in the partition 21, and thence along the partition 21 to the outlet portion 32.

An overflow or outlet pipe 34 for water in the tank extends through the end wall 33 of the tank near the upper edge thereof and may be connected to any suitable means such as a hose (not shown) for conducting the water to a suitable drain.

A cover plate 35 is provided for the top of the tank B and is preferably provided in vertical registration with the chambers 22, 23 and 24, respectively, with openings 36, 37 and 38, respectively, for receiving the pans C.

The pans C substantially conform in shape to the openings 36, 37 and 38 in the cover plate 35 and are received within the chambers 22, 23 and 24, respectively, of the tank B in heat transfer relation with the water in said tank. Preferably the pans C are provided at their upper edges with laterally projecting supporting flanges 39 that extend over adjacent edges of the openings 36, 37 and 38, respectively, and rest upon the cover plate 35. If desired, the pans C may be provided at one end with tabs 40 by which they may be removed from the tank.

For rocking or tilting the tank B on the supporting arms 18 and 19 so that the solutions in the pans C will be agitated over the films or photographic plates in the pans, there is a motor driven cam 41 that engages one side of a depending arm or projection 42 of the tank B. An upright coil spring 43 is provided between the cover portion 13 of the base and the bottom 31 of the tank B to cooperate with the cam 41 to insure the proper rocking motion. Preferably the direction of rotation of the cam 41 is such that it always exerts a downwardly directed force on the depending arm 42 of the tank and thereby maintains the trunnions 14 and 15 of the tank in the slots 16 and 17 in the supporting arms 18 and 19 on the base A. The spring 43 is located in rear of the cam 41 and constantly exerts an upward pressure against the bottom of the tank B, hence the depending arm 42 of the tank in front of the cam is maintained by the spring in proper working engagement with said cam.

In the present instance the electric motor 45 for the cam 41 has a supporting bracket 46 suspended from the underside of the cover portion 13 of the base and has a drive shaft 47 provided with a worm 48 that engages a gear 49 on the cam shaft 50. A housing 51 for the drive shaft 47 and worm 48 projects laterally from the motor 45 and carries a housing 52 for the gear 49.

Fresh water or other suitable cooling medium is conducted by a pipe 60 from a suitable source (not shown) to a manually operable valve 61, thence through a short pipe 62 to a solenoid controlled valve 63, and thence through a pipe or tube 64 to a rubber hose 65 connected to the lower end of the inlet portion 30 of the coil 29 in the tank B. The valve 61 is inside the base A but is provided outside the latter with a suitable operating handle 66. Normally the valve 61 is open so that the flow of water from the pipe 60 to the coil 29 in the tank B is regulated by the solenoid controlled valve 63.

For controlling the action of the valve 63 I have provided a thermostat 70 within the tank B, preferably within and near the bottom of the center chamber 23 thereof, so as to be submerged in the water in said chamber, and have provided a magnetic relay 71 in circuit with the thermostat 70 and solenoid 72 for the valve 63. Thus, when the machine is operating, the action of the thermostat 70 in the tank B is controlled by the temperature of the water or other cooling medium in the tank, the action of the relay 71 is controlled by the thermostat 70, and the action of the solenoid 72 of the valve 63 is controlled by the relay 71. For example, if the temperature of the water in the tank B exceeds a predetermined amount, then the thermostat 70 will close the circuit to the relay 71 so that the latter will cause the solenoid 72 to open the valve 63 and thereby allow fresh water to flow from the pipe 60 to the coil 29 in the tank B to cool the water in said tank sufficiently to reestablish the proper temperature.

In the present instance, there are two independently operable switches 80 and 81, respectively, for controlling the operation of the machine. Preferably the switch 80 controls the operation of the motor while the switch 81 controls the operation of the thermostat 70, relay 71 and solenoid 72. An electric conductor 82 having a plug 83 for engagement with a suitable wall socket (not shown) supplies the electric current to the switches 80 and 81. Thus, the switch 81 may be operated to render the temperature control means operative or inoperative, while the switch 80 may be operated to start or stop the motor 45 and the rocking action produced by the cam 41.

In use, it is desirable to maintain the solutions in the trays C within 3/4° of the selected temperature, such for example, as 65° or 70° F. This temperature is maintained by the water in the tank B. Thus when the temperature of the solutions in the trays C exceeds the selected amount, the fresh supply of cooling water to the tank B must be made until the temperature of the water in said tank falls to the proper level to cause the temperature of the solutions in the trays C to be reduced to the selected amount. Actually the solutions in the trays C and the water in the tank B are affected by the temperature in the room in which the machine is located. Hence the thermostat 70 in the tank B is set to compensate for these conditions.

Assuming that both switches have to be operated to close the circuit to the motor 45 and to the temperature control means consisting of the thermostat 70, relay 71 and solenoid 72, the operation will be as follows: The cam 41 and spring 43 collectively will rock the tank B at a definite rate so that the developing, hardening and fixing solutions in the trays C will be agitated over the films or photographic plates in said trays to assure uniform chemical action over the entire film or plate surface. Such rocking action also permits the use of stronger solutions to gain greater developing and fixing speed. Whenever the temperature of the solutions in the trays C rises above the selected temperature, the temperature of the water in the tank B will likewise rise, hence the thermostat 70 will operate the relay 71 to cause the solenoid 72 to open the valve 63 and thereby permit fresh water to flow through the coil 29 into the tank B to lower the temperature of the water in said tank. The temperature of the solutions in the trays C will respond to and be lowered by the lowered temperature of water in the tank B, hence the proper temperature of the solutions in the trays C will be reestablished and maintained by the water in the tank.

Inasmuch as the water in the coil 29 will absorb heat from the water in the tank B before being discharged into the tank, the heat transfer will tend to equalize or average the temperatures. Such action takes place slowly, hence there is no abrupt change in the temperature.

Thus, from the foregoing it will be apparent that the means for controlling the temperature of the water in the tank B indirectly controls the temperature of the solutions in the trays C. The slots 16 and 17 in the supporting arms 18 and 19 for the tank B permit the tank to be lifted to afford access to the mechanism within the base A whenever desired. The flexible hose 65 enables this lifting action to take place without uncoupling or interfering with the water supply connections to the tank. Moreover the cover plate 35 on top of the tank provides a surface that may be colored red or the same color as the color of the filter light used in a dark room so as to be more readily seen in the dark room where the film or photographic plate developing work is performed. The entire machine is compact and self-contained, hence occupies a minimum of space. The working parts such as the motor 45, cam 41 and valves 61 and 63 are concealed and out of the way, consequently the machine has a neat appearance and may be operated safely in a dark room. The machine is especially useful for developing, hardening and fixing films for spectro-chemical analysis but may, of course, be subjected to any use to which it is adapted. In this connection, it will be apparent from the foregoing that the speed and reproducibility of developing, hardening and fixing films and photographic plates is increased when a machine embodying my invention is employed.

What I claim as my invention is:

1. A machine for processing film or photographic plate, comprising an upwardly opening tank for water having laterally spaced upright partitions dividing the same into a series of chambers, alternate partitions being provided at different ends thereof adjacent the bottom of the tank with openings, a coil for water within said tank adjacent the bottom thereof, said coil having an inlet portion within the chamber at one end of the series and having an outlet portion within the chamber at the opposite end of the series, said coil extending from said inlet portion in the chamber at one end of the series through the openings in said partitions to the outlet portion in the chamber at the opposite end of the series and having lengths thereof in each of said chambers whereby water in the coil will absorb heat from chambers successively from one end to the other of the series before being discharged from said outlet portion, pans for developing, hardening and fixing solutions suspended within the chambers aforesaid in heat transfer relation to water therein, one pan in each chamber, a supply conduit for water connected to the inlet portion of said coil, a valve controlling the flow of water through said supply conduit to said coil, a solenoid for actuating said valve, a magnetic relay in circuit with and controlling the action of said solenoid, a thermostat submerged in and responsive to the temperature of water in an intermediate chamber of the series, said thermostat being in circuit with and controlling the action of the relay, and a switch in circuit with and controlling the action of the thermostat, relay and solenoid aforesaid.

2. In a machine for processing film or photographic plate, an upwardly opening tank for water having two laterally spaced upright partitions dividing the same into first, second and third chambers respectively, the partition between the first and second chambers being provided at one side of the tank adjacent the bottom thereof with an opening permitting water to flow from the first chamber to the second chamber, the partition between the second and third chambers being provided at the opposite side of the tank adjacent the bottom thereof with an opening permitting water to flow from the second chamber to the third chamber, and a coil for water within said tank adjacent the bottom thereof, said coil having an inlet portion extending upwardly through the bottom of said third chamber and having an outlet portion within said first chamber, said inlet portion of the coil being adjacent the second mentioned partition, said coil extending from said inlet portion along the outer side of the second mentioned partition in a direction away from the opening therein, thence around the outer walls of the third chamber to and through the opening in said second mentioned partition to the second chamber, thence along the inner side of the second mentioned partition in a direction away from the opening therein, thence along an outer wall of the second chamber to and through the opening in the first mentioned partition to the first chamber, thence along the outer side of the first mentioned partition to said outlet portion, whereby water in the coil will absorb heat from chambers successively from the third to the first before being discharged from said outlet portion into said first chamber.

3. In a machine for processing film or photographic plate, an upwardly opening tank for water having two laterally spaced upright partitions dividing the same into first, second and third chambers respectively, the partition between the first and second chambers being provided at one side of the tank adjacent the bottom thereof with an opening permitting water to flow from the first chamber to the second chamber, the partition between the second and third chambers being provided at the opposite side of the tank adjacent the bottom thereof with an opening permitting water to flow from the second chamber to the third chamber, and a coil for water within said tank adjacent the bottom thereof, said coil having an inlet portion within said third chamber and having an outlet portion within said first chamber, said coil extending from said inlet portion through the opening in said second mentioned partition to the second chamber, thence through the opening in the first mentioned partition to the outlet portion in said first chamber, whereby water in the coil will absorb heat from chambers successively from the third to the first before being discharged from said outlet portion into said first chamber.

4. In a machine for processing film or photographic plate, an upwardly opening tank for water having two laterally spaced upright partitions dividing the same into first, second and third chambers respectively, the partition between the first and second chambers being provided at one side of the tank adjacent the bottom thereof with an opening permitting water to flow from the first chamber to the second chamber, the partition between the second and third chambers being provided at the opposite side of the tank adjacent the bottom thereof with an opening permitting water to flow from the second chamber to the third chamber, a coil for water within said tank adjacent the bottom thereof, said coil having an inlet portion within said third chamber and having an outlet portion within said first chamber, said coil extending from said inlet portion through the opening in said second mentioned partition to the second chamber, thence through the opening in the first mentioned partition to the outlet portion in said first chamber, whereby water in the coil will absorb heat from chambers successively from the third to the first before being discharged from said outlet portion into said first chamber, pans for developing, hardening and fixing solutions suspended within the chambers aforesaid in heat transfer relation to water therein, one pan in each chamber, a supply conduit for water connected to the inlet portion of said coil, two valves controlling the flow of water through said supply conduit to said coil, one being a normally open manually operable valve, a solenoid for actuating the other of said valves, a magnetic relay in circuit with and controlling the action of said solenoid, a thermostat submerged in and responsive to the temperature of water in the second chamber, said thermostat being in circuit with and controlling the action of said relay, and a switch in circuit with and controlling the action of the thermostat, relay and solenoid aforesaid.

5. In a machine for processing film or photographic plate, an upwardly opening tank for water having two laterally spaced upright partitions dividing the same into first, second and third chambers respectively, the partition between the first and second chambers being provided at one side of the tank adjacent the bottom thereof with an opening permitting water to flow from the first chamber to the second chamber, the partition between the second and third chambers being provided at the opposite side of the tank adjacent the bottom thereof with an opening permitting water to flow from the second chamber to the third chamber, a coil for water within said tank adjacent the bottom thereof, said coil having an inlet portion within said third chamber and having an outlet portion within said first chamber, said coil extending from said inlet portion through the opening in said second mentioned partition to the second chamber, thence through the opening in the first mentioned partition to the outlet portion in said first chamber, whereby water in the coil will absorb heat from chambers successively from the third to the first before being discharged from said outlet portion into said first chamber, pans for developing, hardening and fixing solutions suspended within the chambers aforesaid in heat transfer relation to water therein, one pan in each chamber, a supply conduit for water connected to the inlet portion of said coil, a valve controlling the flow of water through said supply conduit to said coil, a solenoid for actuating said valve, a magnetic relay in circuit with and controlling the action of said solenoid, a thermostat submerged in and responsive to the temperature of water in the second chamber, said thermostat being in circuit with and controlling the action of said relay, and a switch in circuit with and controlling the action of the thermostat, relay and solenoid aforesaid.

6. In a machine for processing film or photographic plate, an upwardly opening tank for water having two laterally spaced upright partitions dividing the same into first, second and third chambers respectively, the partition between the first and second chambers being provided at one side of the tank adjacent the bottom thereof with an opening permitting water to flow from the first chamber to the second chamber, the partition between the second and third chambers being provided at the opposite side of the tank adjacent the bottom thereof with an opening permitting water to flow from the second chamber to the third chamber, a coil for water within said tank adjacent the bottom thereof, said coil having an inlet portion within said third chamber and having an outlet portion within said first chamber, said coil extending from said inlet portion through the opening in said second mentioned partition to the second chamber, thence through the opening in the first mentioned partition to the outlet portion in said first chamber, whereby water in the coil will absorb heat from chambers successively from the third to the first before being discharged from said outlet portion into said first chamber, pans for developing, hardening and fixing solutions suspended within the chambers aforesaid in heat transfer relation to water therein, one pan in each chamber, a supply conduit for water connected to the inlet portion of said coil, a thermostat submerged in and responsive to the temperature of water in the second chamber, a valve controlling the flow of water through the supply conduit to said coil, and means responsive to said thermostat for actuating said valve.

HARRY W. DIETERT.